June 13, 1950        H. B. SHAPER        2,511,482
METHOD OF TESTING HEARING
Filed Sept. 17, 1943
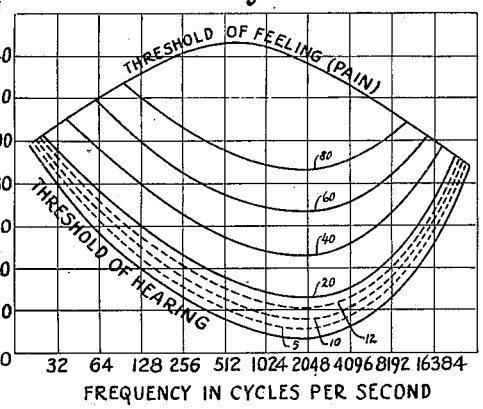
Fig. 1
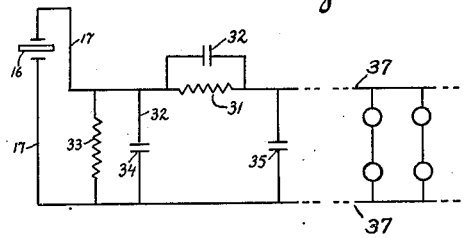
Fig. 4
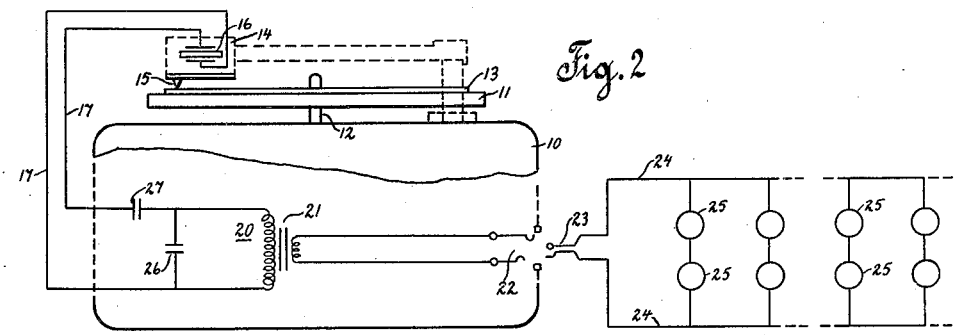
Fig. 2
Fig. 3
INVENTOR
Harry B. Shaper
BY S. Michael Prieles
ATTORNEY Patented June 13, 1950

2,511,482

UNITED STATES PATENT OFFICE 2,511,482

METHOD OF TESTING HEARING

Harry B. Shaper, Cleveland, Ohio, assignor to Sonotone Corporation, Elmsford, N. Y., a corporation of New York Application September 17, 1943, Serial No. 502,743

4 Claims. (Cl. 181—0.5)

This invention relates to audiometers and particularly to group audiometers of the type suitable for measuring simultaneously the hearing of a number of individuals such as school children. This application is a continuation-in-part of application Ser. No. 350,594, filed August 3, 1940, now abandoned.

Among the objects of the invention is an audiometer arrangement of the foregoing type in which a sound record reproducer, such as a phonograph, having a record of a series of signal groups of substantially pure tone oscillations of predetermined different pitches of the principal part of the audiofrequency range, each signal group consisting of the same tone recorded at predetermined different levels is combined with receivers so that the pure tone of the signal subgroups of each group are reproduced with accurately predetermined gradations of sound intensity of the given tone for enabling accurate measurement of the hearing with pure tones of different frequencies.

The foregoing and other objects of the invention will be best understood from the following description of exemplifications thereof, reference being had to the accompanying drawings wherein;

Fig. 1 is a curve diagram showing the hearing characteristics of a normal person;

Fig. 2 is a diagrammatic view illustrating the general arrangement of an audiometer of the invention;

Fig. 3 is a symbolic illustration of the signal recorded on the record carrier of Fig. 2, and Fig. 4 is a view similar to Fig. 2, illustrating another circuit arrangement for such audiometer.

An ideal audiometer should enable a person without technical skill to make accurate measurements of the hearing sensitivity of an individual over the principal range of audible sound. The design of a satisfactory audiometer must take into consideration the hearing characteristics of a person having normal hearing as determined from accurate measurements of the hearings sensitivity of a group of individuals having good normal hearing.

Typical results of such measurements are shown in Fig. 1 wherein the lower curve marked "Threshold of hearing" and the upper curve marked "Threshold of feeling" give the limits of the hearing ability of a person having normal hearing. The lower curve shows, for each frequency, the intensity of the sound in decibels, above an arbitrarily chosen level, at which the tone is barely audible. The upper curve gives for each frequency the intensity of the sound which is so loud that it produces a sensation of feeling and becomes painful. The points at which these two curves intersect give the lower and upper frequency limits of audibility. Each of the array of dash-line curves, marked by numerals 5, 10, 12, etc., is a curve of equal sensation level of hearing, at all frequencies, and gives, for each frequency, the sound intensity in decibels which produces the same sensation level of hearing above the threshold of hearing of a normal person. These curves are useful for making measurements of hearing defects at the different frequencies and in computing the percentage of hearing loss of a person having defective hearing. By measuring the hearing of an individual of defective hearing at different tones, and comparing it with that of a normal person, as shown in the curves of Fig. 1, the percentage of his hearing loss and the character of his impairment may be determined.

Taking, for instance, the tone of 1024 cycles at which the total range of hearing sensitivity between the lower and upper threshold of hearing of a normal person is about 130 db., a person having a hearing loss of 60 db. at this frequency is said to have a 50% loss at the given frequency. Prior to the invention, relatively expensive audiometers formed of an oscillation generator and an attenuator for producing in a receiver pure tones of different frequencies had to be employed for individually measuring the hearing of a person.

The importance of provided equipment for testing the hearing of a large number of individuals was recognized long ago. This is particularly desirable in the case of school children, in order to discover the children whose hearing is impaired, so that proper adjustment may be made in their education, or that their impairment should be given the proper care.

Prior to the invention, the only device available for testing the hearing of a large number of individuals, such as school children, consisted of a phonograph having a record for reproducing, through receivers connected to the phonograph pickup, speech recorded at predetermined different levels indicative of the general hearing ability of the tested individual, as described in Fletcher Patent 1,661,751, for instance. In the commercially available devices of such type, the recorded speech consisted of a series of numbers, each comprising a uniform number of digits arranged in groups, for instance, three numbers per group, which were recorded by a person capable of maintaining a substantially uniform intensity and quality of speech. This necessarily, required a great deal of care and experimentation. In addition, such test of a large number of individuals could not supply information regarding the hearing ability of the tested individuals at the different pure tone frequencies of the audible range. To obtain the desired information regarding the hearing ability at the different pure tone frequencies, additional measurement of the hearing of each individual had to be made with a standard audiometer, of the type shown in Wegel Patent 1,613,423, for instance, employing an oscillation generator and an attenuator for producing in a receiver pure tones of different frequencies calibrated in predetermined sensation levels of hearing.

The invention overcomes the limitations presented by prior art reproducer-type hearing testing devices and provides a group audiometer making possible simultaneous accurate measuring of the hearing of a large number of individuals with pure tones of the different frequencies. According to the invention, the hearing of a group of individuals is tested by reproducing with one or more receivers, through which the individuals listen, a signal record having a series of group recordings of substantially pure tone oscillations of predetermined different frequencies distributed over the principal part of the audiofrequency range, each group recording consisting of a series of subgroup recordings of the same tone recorded at predetermined different levels, and each subgroup recording consisting of irregularly different smaller and larger numbers of repetitions of the same tone so that the subgroups of each group of recordings of the same tone will be reproduced with accurately predetermined gradations of sound intensity necessary for measuring predetermined degrees of hearing or hearing loss with pure tone oscillations and asking the individuals to write down the number of tones of each subgroup he hears. The number of tones of the subgroup which the individual cannot hear, as indicated by the incorrectly written number, gives a measure of the hearing loss of the tone of each particular frequency.

The making of the record required for a group audiometer designed in accordance with the principles of the invention presents no difficulties because electric sources of pure tone oscillations of the required different test frequencies are readily available, and the graded attenuation of the pure tone signals forming the subgroups of each pure tone group is very easy, as is also the calibration of the overall performance of the signal recording pickup and the receiver elements required in order to assure that the receivers impress on the ear the pure tone signals at the different accurately graded sensation levels. In addition, the individual that is subjected to the hearing test has merely to distinguish whether he heard the pure tone of each subgroup one, two, or three times, and the test does not involve the knowledge of a particular language in which the test record was made.

An audiometer exemplifying one form of the invention is shown diagrammatically in Fig. 2. A usual turn-table phonograph has a suitable driving mechanism enclosed in a casing 10, which rotates turn-table 11 mounted on a shaft 12 projecting through the top of the casing 10. A record carrier in the form of the usual disc 13 is rotated by the turn-table 11. A pickup 14, carried at the end of a pivotally mounted arm, has a stylus 15 engaging a spiral record groove previously formed in the record disc 13. In the form shown, the phonograph pickup 14 has the usual piezo-electric transducer element 16 which translates the spiral sound record of the disc 13 into electrical oscillations which are impressed through leads 17 on a reproducing circuit 20. The reproducing circuit 20 comprises a transformer 21 having a primary winding connected to the two pickup leads 17 and a secondary winding connected through a jack 22 and a plug 23 to two leads 24 of a reproducer cord between which are connected an array of receivers 25 which are used by the different individuals subjected to the test. A condenser 26 connected in parallel and a condenser 27 connected in series to the primary winding of the transformer 21 act as a voltage divider which applies the proper fraction of the output voltage of the pickup 16 to the primary winding of the transformer 21, and therethrough to the receiver leads 24.

The parallel condenser 26 is made large enough so that it represents to the pickup crystal unit 16 a substantially open circuit so that slight variations of its output that might be caused by variations of the temperature do not produce any material effect on the part of the voltage output impressed across the primary winding of the output transformer 21. The step-down transformer 21 has a sufficiently low step-down ratio so that the voltage impressed on the secondary winding on the receivers remains substantially the same no matter whether one, two or a large number, up to as much as 100 pairs of receivers, are connected between the reproducer leads 25. Two receivers 25 are shown connected between the receiver leads, the available voltage being sufficient for actuating both receivers.

In distinction from prior art group audiometers of a similar general type, the record disc 13 has recorded therein not speech, but pure tone oscillations of a character that enables accurate determination of the hearing ability of an individual having one of the receivers 25 placed against his ear so as to hear the reproduction of a recording of a series of groups of pure tone oscillations at predetermined different frequencies in the audiofrequency range, for instance, at 250, 500, 1000, 2000, 4000 and 5000 cycles, each group consisting of a series of subgroups of the same tone, the successive subgroups consisting of an irregularly different smaller and larger number of the same tone reproduced with accurately predetermined gradations of the hearing sensation level usually required for accurate measurement of hearing ability.

Fig. 3 illustrates schematically parts of a test record actually used in such audiometer. It is shown only for two pure tone test frequencies; namely, for 500 and 1000 cycles. Thus, the record group of the 500 cycle tone, which is recorded on the disc 13 as a part of a continuous spiral, is, for the sake of explanation, shown arrayed in a row of subgroups under different designating letters A to L, and consists of subgroups arrayed under the letters A to L, the subgroups consisting of irregularly different smaller and larger numbers of the same tone, namely, subgroup A, 2 times the tone—subgroup B, 1 times the tone—subgroup C of 3 times the tone—subgroup D, two times the tone, etc., as shown.

The series of subgroups of each group of pure tone signals of the same frequency are so recorded in their relation to the response characteristics of the pickup 14, the receivers 25 of the circuit 20 interconnecting the receivers 25 to the group 14, that successive subgroups or subgroup sections of each group of the same tone are reproduced in predetermined degrees or gradations of attenuation corresponding to different sensation levels of hearing, as indicated in Fig. 1. For instance, in the case of the 500 cycle tone group, subgroup A is recorded so that it is reproduced at the sensation level indicated in Fig. 1 by the dash-line curve 5, group B is similarly reproduced at the levels indicated by the dash-line curve 10, subgroup C according to the dash-line curve 12, etc., as shown. Each other pure tone group is similarly recorded and reproduced.

Each individual which is subjected to the test is given a chart with rows and columns and is instructed to listen to the pure tone signals and write in sequence on the chart how many times he hears the tone which reaches him. Such instructions may be incorporated in the audiometric record of the tones. For instance, the reproduction of the record 13 may start as follows:

"You will hear a tone occurring once, twice or three times. Write down the number of times you hear the tone by entering the figure 1, 2 or 3 in the column which you hear announced. Continue in the same column until the tone disappears. Now please write in column 5 . . ." followed by the signals of the subgroups of the group named, and at the end of the signals of this group, the individual under test will hear the announcement "Now write in column 2 . . ." proceeding in a similar way with each other signal group.

In making the audiometric record on a phonograph disc or another signal carrier, the following procedure may be followed: The phones are calibrated on the ear of a person having normal hearing as established by tests with a standard audiometer, so as to determine the voltage required by the telephone at each of the test frequencies for each threshold of hearing. In addition, the response characteristics of the available recording mechanism and pickup mechanism and recording medium are calibrated for each of the frequencies under test so as to determine the voltage which has to be applied to the cutter in order to obtain from the pickup a voltage required to impress on the receivers the voltage necessary to produce the desired accurately graded levels of sound intensity as determined by the previous calibration of the receivers, taking into account the characteristics of the circuit interconnecting the pickup and the receivers.

As an aid in practicing the invention and without in any way intending to restrict thereby its scope, there are given below the design data used in a commercial group audiometer of the type shown in the drawing.

A standard commercially available piezo-electric pickup having an output voltage higher than required for the audiometer is used. A step-down transformer 21 having a step-down ratio of 22 to 1, in combination with a series condenser 27 of .005 microfarad and a shunt condenser 26 of .003 microfarad, impressed on the reproducer leads 17 a voltage sufficient to operate up to 100 standard piezo-electric receivers connected in pairs, as shown in Fig. 2, each receiver having a capacity of about .003 microfarad.

With such arrangement, substantially the same accuracy of the measurements of the hearing ability at the different tones may be obtained irrespective of whether only two receivers or 100 receivers are connected to the receiver cord 25. The subgroups of each recorded signal group of the same tone were recorded so as to reproduce the tone sequences of the subgroups of each frequency in sensation levels differing by three decibel steps, each ear being separately tested while sound is kept away from the other ear.

Various other modifications of the invention will suggest themselves to those skilled in the art. Thus, as shown in Fig. 4, instead of using a step-down transformer in the interconnection between a piezo-electric pickup and the receiver leads 37, the pickup leads 17 may be connected to the receiver leads 24 through a circuit portion including series network elements formed of a resistor 31 and a shunting condenser 32, with a shunting network formed of a resistor 33 and a parallel connected condenser 34 in front, and condenser 35 behind the series network elements 31, 32. The shunting resistor and condenser 33, 34 serve to raise the frequency response of the pickup in the low frequency range and provide the proper terminal impedance for the piezo-electric element 16 of the pickup.

The series network formed of the resistor 31 and condenser 32 serve to raise the higher frequencies. The terminating condenser 35 connected across the receiver leads 24 presents an impedance low enough so that no matter whether 10 or 40 or more receivers are connected between the leads 24, the voltage across them will remain substantially the same. An arrangement of the type shown in Fig. 4, which proved successful in actual operation, had the following constants:

Resistor 31 _____ megohms __ .25
Resistor 33 _____ do ____ .5
Condenser 32 _____ microfarad __ .005
Condenser 34 _____ do ____ .02

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. The method of testing the hearing of an individual comprising reproducing from a record a plurality of sound sequences of pure tones of different predetermined frequencies of the audible frequency range; each of said sound sequences comprising a series of sound groups of irregularly different numbers of repetitions of a pure tone of one predetermined frequency of the audible frequency range at predetermined correlated different levels of intensity corresponding to predetermined different calibrated sensation levels of hearing by a normal person, and having an individual indicate the number of pure tone repetitions heard by him so that the incorrect indication of the correct number of tone repetitions of one of said sound groups shall give a substantially correct measure of the hearing of the individual at said one of said predetermined frequencies.

2. The method of simultaneously testing the hearing of a plurality of individuals comprising reproducing from a record a plurality of sound sequences of pure tones of different predetermined frequencies of the audible frequency range; each of said sound sequences comprising a series of sound groups of irregularly different numbers of repetitions of a pure tone of one of said predetermined frequencies at predetermined correlated different levels of intensity corresponding to predetermined different calibrated sensation levels of hearing by a normal person, and having each of said individuals indicate the number of pure tone repetitions heard by him so that the incorrect indication of the correct number of tone repetitions of one of said sound groups shall give a substantially correct measure of the hearing of each of the individuals, respectively, at said one of said predetermined frequencies.

3. The method of testing the hearing of an individual comprising reproducing from a record a series of sound groups of irregularly different numbers of repetitions of a pure tone of one predetermined frequency of the audible frequency range at predetermined correlated different levels of intensity corresponding to predetermined different calibrated sensation levels of hearing by a normal person, and having said individual indicate the number of pure tone repetitions heard by him so that the incorrect indication of the correct number of tone repetitions of one of said sound groups shall give a substantially correct measure of the hearing of said individual at said one predetermined frequency.

4. The method of simultaneously testing the hearing of a plurality of individuals comprising reproducing from a record a series of sound groups of irregularly different numbers of repetitions of a pure tone of one predetermined frequency of the audible frequency range at predetermined correlated different levels of intensity corresponding to predetermined different calibrated sensation levels of hearing by a normal person, and having each of said individuals indicate the number of pure tone repetitions heard by him so that the incorrect indication of the correct number of tone repetitions of one of said sound groups shall give a substantially correct measure of the hearing of each of the individuals, respectively, at said one predetermined frequency.

HARRY B. SHAPER.

REFERENCES CITED

The following references are of record in the file of this patent:

UNITED STATES PATENTS

| Number | Name | Date |
| --- | --- | --- |
| 1,661,751 | Fletcher | Mar. 6, 1928 |
| 2,112,569 | Lybarger | Mar. 29, 1938 |